United States Patent
He et al.

(10) Patent No.: US 11,045,888 B2
(45) Date of Patent: Jun. 29, 2021

(54) PORTABLE WIRE CUTTING DEVICE FOR SAMPLING STEEL INGOT

(71) Applicant: NANJING DEVELOP ADVANCED MANUFACTURING CO., LTD., Nanjing (CN)

(72) Inventors: Lingjun He, Nanjing (CN); Changhua Chen, Nanjing (CN); Hong Zhang, Nanjing (CN); Li Zhang, Nanjing (CN); Leijun Song, Nanjing (CN); Jiayin Xu, Nanjing (CN); Chaogang Shi, Nanjing (CN); Yangdao Gong, Nanjing (CN); Yao Ha, Nanjing (CN); Xiaolei Liu, Nanjing (CN); Jiao Wang, Nanjing (CN); Xinhua Chen, Nanjing (CN)

(73) Assignee: NANJING DEVELOP ADVANCED MANUFACTURING CO., LTD., Nanjing (CN)

( * ) Notice: Subject to any disclaimer, the term of this patent is extended or adjusted under 35 U.S.C. 154(b) by 0 days.

(21) Appl. No.: 16/980,432

(22) PCT Filed: Oct. 9, 2018

(86) PCT No.: PCT/CN2018/109460
§ 371 (c)(1),
(2) Date: Sep. 14, 2020

(87) PCT Pub. No.: WO2019/119931
PCT Pub. Date: Jun. 27, 2019

(65) Prior Publication Data
US 2021/0107077 A1    Apr. 15, 2021

(30) Foreign Application Priority Data
Dec. 20, 2017 (CN) .......................... 201711384684.X

(51) Int. Cl.
   *B23D 57/00*    (2006.01)
   *G01N 1/04*    (2006.01)
   (Continued)

(52) U.S. Cl.
   CPC .......... *B23D 57/0007* (2013.01); *B21F 11/00* (2013.01); *B23H 7/02* (2013.01); *G01N 1/04* (2013.01)

(58) Field of Classification Search
   CPC ........................ B23D 57/007; B23D 57/003; B23D 57/0015; B23D 57/0023; B23D 57/0061;
   (Continued)

(56) References Cited

U.S. PATENT DOCUMENTS

| 4,633,848 | A | * | 1/1987 | Bresciani | B23Q 27/00 125/10 |
| 5,271,145 | A | * | 12/1993 | Westerman, Jr. | B23D 57/0015 29/402.11 |
| 2012/0017741 | A1 | * | 1/2012 | Lange | B28D 5/042 83/651.1 |

FOREIGN PATENT DOCUMENTS

| CN | 2880342 Y | 3/2007 |
| CN | 203209808 U | 9/2013 |

(Continued)

*Primary Examiner* — Kenneth E Peterson
*Assistant Examiner* — Liang Dong
(74) *Attorney, Agent, or Firm* — Bayramoglu Law Offices LLC

(57) ABSTRACT

A portable wire cutting device for sampling a steel ingot includes a wire rack device, a driving system, and a multi-axis moving device. The wire rack device includes a first corner wheel, a second corner wheel, a transition wheel, a steering wheel, a first wire rack, a second wire rack, and a wire winding drum. The driving system includes a wire drum motor and a molybdenum wire, wherein the wire drum motor provides power driving for the operation of a cutting line; and the molybdenum wire is a closed molybdenum (Continued)

wire coil connected in an end-to-end manner, the molybdenum wire is wrapped around the first corner wheel, the second corner wheel, the wire winding drum, and an inner side of the transition wheel in a looping manner, and during operation, the cutting line performs wire cutting on an object by the molybdenum wire.

5 Claims, 2 Drawing Sheets

(51) Int. Cl.
    *B23H 7/02*       (2006.01)
    *B21F 11/00*     (2006.01)

(58) Field of Classification Search
    CPC ........................ B23D 57/0053; B23D 57/0092;
                                             B23D 61/18;
                    B23D 61/185; B21F 11/00; B21F 15/00;
                    B21F 23/00; B23H 7/02; B26D 1/547;
                  B26D 1/553; B26D 1/5475; B28D 5/045;
                    B28D 5/042; B28D 1/08; B28D 1/124;
                  B28D 1/084; B24B 27/0633; B26F 3/12;
                                           B26B 27/002
    See application file for complete search history.

(56)                 References Cited

FOREIGN PATENT DOCUMENTS

| CN | 204934787 U | 1/2016 | |
| CN | 108106878 A | 6/2018 | |
| JP | 4988195 B2 | 8/2012 | |
| SU | 1269923 A1 * | 11/1986 | ......... B23D 57/0053 |

* cited by examiner

PORTABLE WIRE CUTTING DEVICE FOR SAMPLING STEEL INGOT

CROSS REFERENCE TO THE RELATED APPLICATIONS

This application is the national stage entry of International Application No. PCT/CN2018/109460, filed on Oct. 9, 2018, which is based upon and claims priority to Chinese Patent Application No. 201711384684.X, filed on Dec. 20, 2017, the entire contents of which are incorporated herein by reference.

TECHNICAL FIELD

The present invention relates to a portable wire cutting device for sampling a steel ingot.

BACKGROUND

Steel ingot raw materials of all forging plants must pass acceptance inspection before they can be put in storage, and they can be put in use only after the warehouse entry and delivery list are issued. In principle, the acceptance inspection is conducted according to national standards. If there are no national standards, enterprise specifications must be formulated and submitted to the purchasing department for consultation and confirmation, and then the acceptance inspection is conducted according to enterprise requirements. Each batch of products must have a product warranty, indicating the product name, standard grade, required chemical composition, unit weight, and production date. The chemical composition must meet the requirements of the corresponding product standards. If the chemical composition has a deviation from the quality guarantee, which goes beyond the standard range, the supplier is notified and the products are treated according to quality. If the supplier has objections, the products must be treated within 7 working days and cannot be put in storage or use during treatment.

In recent years, with the development of metallurgy, petroleum, petrochemicals, aerospace, shipbuilding and other industries, the demand for forgings has been increasing, so that the quality requirements and time requirements for steel ingots have also increased accordingly. In terms of the chemical composition of the steel ingots, two main measures can be taken: one is wet inspection, and the other is spectral inspection. To this end, steel mills strive to improve the metallurgical quality and focus on the application of new technologies, and spectral inspection is usually preferred. The riser and nozzle in the steel ingot are both scrap parts and should be removed. If they are not removed completely, they will be forged into the forging and cause waste. Spectral inspection is the main method to determine the waste part of the riser and nozzle in the steel ingot.

Therefore, a portable wire cutting device for sampling a steel ingot is needed to solve the aforementioned problem.

SUMMARY

Object of the invention: in view of the defects in the prior art, the present invention provides a portable wire cutting device for sampling a steel ingot.

Technical solution: in order to solve the aforementioned technical problem, the portable wire cutting device for sampling a steel ingot in the present invention employs the following technical solution:

A portable wire cutting device comprises a wire rack device, a molybdenum wire, and a multi-axis moving device. The wire rack device comprises a first corner wheel, a second corner wheel, a transition wheel, a steering wheel, a first wire rack, a second wire rack, and a wire winding drum. The first wire rack and the second wire rack are hingedly connected. The second corner wheel is disposed at a hinge joint of the first wire rack and the second wire rack. An end of the second wire rack away from the hinge joint is provided with the first corner wheel, and an end of the second wire rack away from the hinge joint is hingedly connected to the multi-axis moving device. The transition wheel is disposed between the second corner wheel and the steering wheel. The first wire rack and the wire winding drum are respectively disposed on two sides of the second wire rack. The molybdenum wire is wrapped around the first corner wheel, the second corner wheel, and the wire winding drum in a looping manner. The molybdenum wire passes through an inner side of the transition wheel. The steering wheel and the wire winding drum are both disposed on the multi-axis moving device.

Furthermore, the multi-axis moving device comprises an X-axis moving device and a Y-axis moving device. The X-axis moving device and the Y-axis moving device are used to conveniently adjust a position of the wire rack device, so as to adjust a cutting position of the wire cutting device.

Furthermore, the multi-axis moving device further comprises a magnetic attraction disc, wherein the magnetic attraction disc is disposed on a bottom of the multi-axis moving device. The magnetic attraction disc is fixed to a steel ingot surface by means of magnetic attraction.

Furthermore, the second wire rack is provided with a plurality of transition wheel mounting sites. A mounting position of the transition wheel can be conveniently adjusted, and a cutting depth of the wire cutting device can be conveniently adjusted.

Furthermore, the portable wire cutting device further comprises a wire drum motor, wherein an output shaft of the wire drum motor is connected to the wire winding drum. The wire drum motor is used to conveniently adjust a cutting speed of the molybdenum wire.

Furthermore, a first steering locking device is disposed at the hinge joint of the first wire rack and the second wire rack. The first steering locking device is used to conveniently define an angle between the first wire rack and the second wire rack.

Furthermore, a second steering locking device is disposed on the steering wheel. The second steering locking device is used to conveniently define an angle between the second wire rack and the multi-axis moving device.

Furthermore, the multi-axis moving device further comprises a Z-axis moving device to facilitate movement of the wire rack device in a Z-axis direction.

Furthermore, the second corner wheel is provided with first scale lines to facilitate observation of the angle between the first wire rack and the second wire rack.

Furthermore, the steering wheel is provided with second scale lines to facilitate observation of the angle between the second wire rack and the multi-axis moving device.

Beneficial effects: the portable wire cutting device for sampling a steel ingot in the present invention has a reasonable structure, saves the steps of taking-up and setting-out a molybdenum wire cutting device, and is easy and convenient to operate; the wire rack device, the wire winding drum, and the multi-axis moving device can quickly and precisely control the cutting thickness, cutting depth, and cutting shape of a steel ingot during sampling, so that the working efficiency is greatly improved. When the cutting device is not in operation, it is convenient to fold the wire rack device, the operation is simple, and the cutting device is convenient to carry.

DETAILED DESCRIPTION OF THE EMBODIMENTS

The present invention will be further clarified below with reference to the accompanying drawings and specific embodiments. It should be understood that these embodiments are only used to illustrate the present invention and not to limit the scope of the present invention. Various modifications of equivalent forms made by those skilled in the art to the present invention after reading the present invention all fall within the scope defined by the claims appended to the present application.

The embodiments of the present invention will be further illustrated in detail below in conjunction with FIG. 1 and FIG. 2. Obviously, the described embodiments are merely some, rather than all of the embodiments of the present invention. All other embodiments obtained by those of ordinary skill in the art without making creative efforts fall within the protection scope of the present invention.

Figure 1:
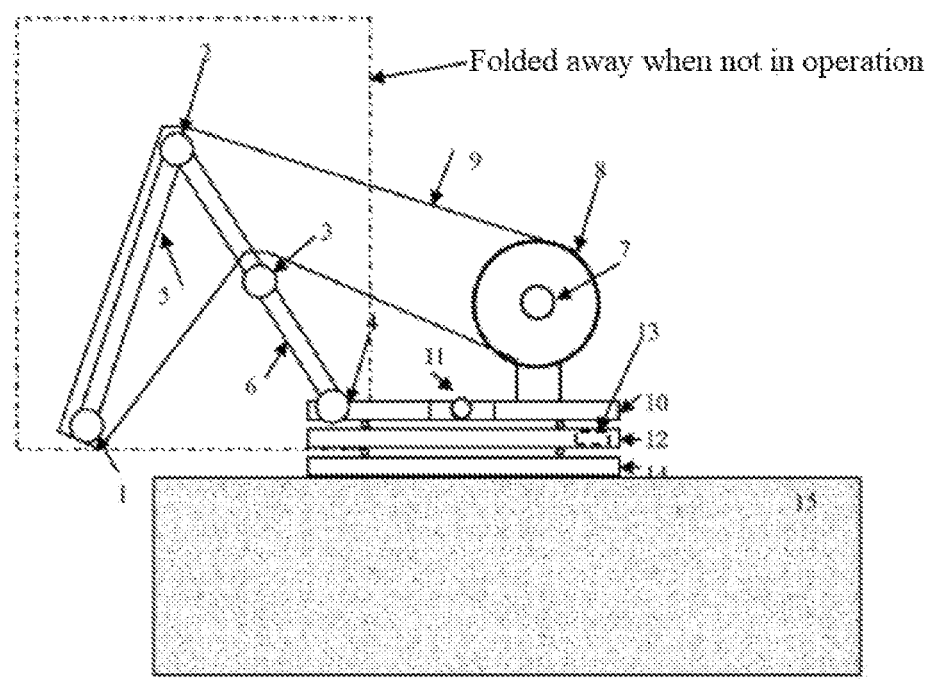
FIG. 1 is a front structural view of a portable wire cutting device in the present invention.
Figure 2:
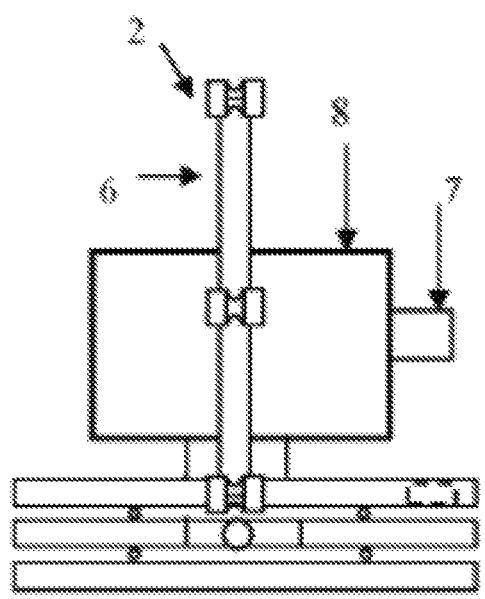
FIG. 2 is a side structural view of the portable wire cutting device in the present invention.

As shown in FIG. 1, the portable wire cutting device provided in the present invention includes a wire rack device, a molybdenum wire 9, and a multi-axis moving device. The wire rack device includes a first corner wheel 1, a second corner wheel 2, a transition wheel 3, a steering wheel 4, a first wire rack 5, a second wire rack 6, and a wire winding drum 8. The first wire rack 5 and the second wire rack 6 are hingedly connected. The second corner wheel 2 is disposed at a hinge joint of the first wire rack 5 and the second wire rack 6. An end of the second wire rack 6 away from the hinge joint is provided with the first corner wheel 1, and an end of the second wire rack 6 away from the hinge joint is hingedly connected to the multi-axis moving device. The transition wheel 3 is disposed between the second corner wheel 2 and the steering wheel 4. The first wire rack 5 and the wire winding drum 8 are respectively disposed on two sides of the second wire rack 6. The molybdenum wire 9 is wrapped around the first corner wheel 1, the second corner wheel 2, and the wire winding drum 8 in a looping manner. The molybdenum wire 9 passes through the inner side of the transition wheel 3. The steering wheel 4 and the wire winding drum 8 are both disposed on the multi-axis moving device. The portable wire cutting device further includes a wire drum motor 7, where an output shaft of the wire drum motor 7 is connected to the wire winding drum 8. The wire drum motor is used to conveniently adjust the cutting speed of the molybdenum wire. Preferably, the second corner wheel 2 is provided with first scale lines to facilitate observation of the angle between the first wire rack and the second wire rack. Furthermore, the steering wheel 4 is provided with second scale lines to facilitate observation of the angle between the second wire rack and the multi-axis moving device.

The wire drum motor 7 provides power driving for the operation of a cutting line. The molybdenum wire 9 is a closed molybdenum wire coil connected in an end-to-end manner, and is wrapped around the corner wheel 1, the corner wheel 2, the transition wheel 3, and the wire winding drum 8 to form a closed-loop continuous cutting line. During operation, the cutting line performs wire cutting on an object by means of the molybdenum wire 9.

Preferably, a first steering locking device is disposed at the hinge joint of the first wire rack 5 and the second wire rack 6. The first steering locking device is used to conveniently define the angle between the first wire rack and the second wire rack. A second steering locking device is disposed on the steering wheel 4. The second steering locking device is used to conveniently define the angle between the second wire rack and the multi-axis moving device.

The multi-axis moving device includes an X-axis moving device 10 and a Y-axis moving device 12. The X-axis moving device 10 and the Y-axis moving device 12 are used to conveniently adjust the position of the wire rack device, so as to adjust the cutting position of the wire cutting device. Preferably, the multi-axis moving device further includes a magnetic attraction disc 14, where the magnetic attraction disc 14 is disposed on the bottom of the multi-axis moving device. The magnetic attraction disc 14 is fixed to a steel ingot surface 15 by means of magnetic attraction.

Specifically, the multi-axis moving device includes an X-axis platform 10, an X-axis motor 11, a Y-axis platform 12, and a Y-axis motor 13. The magnetic attraction disc 14 is a cylinder with a strip-shaped permanent magnet or constant magnet arranged therein, and the magnet therein is controlled to rotate by a rotation handle; the bottom thereof is made of a soft magnetic material, which is a ferrite material easily magnetized and demagnetized in a weak magnetic field. The magnetic attraction disc 14 is fixed to the steel ingot surface 15 by means of magnetic attraction.

Preferably, the second wire rack 6 is provided with a plurality of transition wheel mounting sites, so that the mounting position of the transition wheel 3 can be conveniently adjusted, and the cutting depth of the wire cutting device can be conveniently adjusted.

Embodiment 1

1. In chemical sampling of a large workpiece, a raised portion of a steel ingot needs to be cut according to design requirements, where the steel ingot is a square ingot, and the cutting sample has a trapezoidal shape. The dimensions of the sample trapezoid are a bottom width of 20 mm, a height of 15 mm, a trapezoid angle of 135 degrees and a transition from the bottom surface to the waist surface of R2 mm. The cutting depth of the sample is 100 mm.

2. A wire transport mechanism and the wire racks are selected to be mounted on a working table. During operation, the wire transport mechanism and the wire racks are moved by using the workpiece as a reference, to realize cutting of the workpiece, with the dimensions controlled to be 300*300*350 mm, and the working stroke 100*100 mm. When not in operation, the portable wire cutting device is packed in a suitcase, while when in operation, two cantilevers are used for free angle adjustment and locking (as shown in FIG. 1).

3. The molybdenum wire performs cutting in a 45° diagonal direction with the horizontal plane of the working table, and the slope of the 45° diagonal line can be adjusted by adjusting the steering of the two cantilever wire racks.

4. The two corner wheels are both marked with 360 degrees, where long scale lines are employed for 0 degree, 90 degrees, 180 degrees, and 270 degrees, medium scale lines are employed every ten degrees, and short scale lines are employed for others.

5. The two cantilever wire racks both have central scale lines, where the adjusting transition wheel in the middle of one cantilever wire rack is not marked with angles, but can move up and down by 100 mm and can be locked.

6. A wire transport motor employs a stepper motor control mode, the molybdenum wire has a diameter of 0.30 mm, the wire transport speed is fast wire feed (10 m/s), and no roughness requirements exist.

7. The movement of the working table is controlled using an X-Y axis combined stepper motor.

8. A lift pump with a pressure of 1 meter supplies a coolant using a plastic pot of 10 Kg.

9. The control system of the wire cutting device has dimensions of 300*300*200 mm, where the single board, high frequency, and travel switch are all integrated, and the wire cutting device is packed in a suitcase when not in operation.

The portable wire cutting device for sampling a steel ingot in the present invention has a reasonable structure, saves the steps of taking-up and setting-out a molybdenum wire cutting device, and is easy and convenient to operate; the wire rack device, the wire winding drum, and the multi-axis moving device can quickly and precisely control the cutting thickness, cutting depth, and cutting shape of a steel ingot during sampling, so that the working efficiency is greatly improved. When the cutting device is not in operation, it is convenient to fold the wire rack device, the operation is simple, and the cutting device is convenient to carry. The wire cutting device is used to cut the steel ingot to separate the test sample thereof. For example, the steel ingot is a round ingot, a square ingot, or an octagonal ingot, the raised portion of the steel ingot is cut, and the cutting sample has a trapezoidal or round shape.

The above descriptions are merely preferred embodiments of the present invention and are not intended to limit the present invention. Any modifications, equivalent replacements, improvements and the like made within the spirit and principle of the present invention should be included in the protection scope of the present invention.

What is claimed is:

1. A portable wire cutting device, comprising:
a wire rack device, a molybdenum wire, and a multi-axis moving device,
wherein the wire rack device comprises a first corner wheel, a second corner wheel, a transition wheel, a steering wheel, a first wire rack, a second wire rack, and a wire winding drum;
the first wire rack and the second wire rack are hingedly connected; the second corner wheel is disposed at a hinge joint of the first wire rack and the second wire rack;
an end of the first wire rack away from the hinge joint is provided with the first corner wheel, and an end of the second wire rack away from the hinge joint is pivotably connected to the multi-axis moving device by the steering wheel;
the transition wheel is disposed between the second corner wheel and the steering wheel; the first wire rack and the wire winding drum are respectively disposed on two sides of the second wire rack;
the molybdenum wire is wrapped around the first corner wheel, the second corner wheel, and the wire winding drum in a looping manner; the molybdenum wire is passed around the transition wheel, between the transition wheel and the second corner wheel; the steering wheel and the wire winding drum are both disposed on the multi-axis moving device.

2. The portable wire cutting device according to claim 1, wherein the multi-axis moving device comprises an X-axis moving device and a Y-axis moving device.

3. The portable wire cutting device according to claim 1, wherein the multi-axis moving device comprises a magnetic attraction disc, and the magnetic attraction disc is disposed on a bottom of the multi-axis moving device.

4. The portable wire cutting device according to claim 1, further comprising a wire drum motor, wherein an output shaft of the wire drum motor is connected to the wire winding drum.

5. The portable wire cutting device according to claim 1, wherein the multi-axis moving device comprises a Z-axis moving device.

* * * * *